US011083329B2

(12) United States Patent
Kelly et al.

(10) Patent No.: US 11,083,329 B2
(45) Date of Patent: Aug. 10, 2021

(54) MULTI-PHASE CIRCUIT FLOW-THROUGH HEATER FOR AEROSPACE BEVERAGE MAKER

(71) Applicant: B/E AEROSPACE, INC., Winston-Salem, NC (US)

(72) Inventors: Luke E. Kelly, Basehor, KS (US); Brian P. Mills, Blue Springs, MO (US); Brian Rutherford, Stilwell, KS (US); Stuart A. Dietz, Topeka, KS (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 15/401,020

(22) Filed: Jan. 7, 2017

(65) Prior Publication Data

US 2017/0112319 A1 Apr. 27, 2017

Related U.S. Application Data

(63) Continuation-in-part of application No. 14/754,641, filed on Jun. 29, 2015.
(Continued)

(51) Int. Cl.
*A47J 31/54* (2006.01)
*F24H 1/14* (2006.01)
*F24H 1/10* (2006.01)

(52) U.S. Cl.
CPC ........... *A47J 31/545* (2013.01); *A47J 31/542* (2013.01); *F24H 1/101* (2013.01); *F24H 1/142* (2013.01)

(58) Field of Classification Search
CPC ... A47J 31/542; A47J 31/545; B64D 11/0007; B64D 11/04; F24H 1/101; F24H 1/142
(Continued)

(56) References Cited

U.S. PATENT DOCUMENTS 3,230,346 A * 1/1966 Eckerfeld ............... F24H 1/103
392/494
3,898,428 A 8/1975 Dye et al.
(Continued)

FOREIGN PATENT DOCUMENTS

CN 2765102 Y 3/2006
CN 1918438 A 2/2007
(Continued)

OTHER PUBLICATIONS

International Search Report dated Sep. 29, 2015 from PCT/US2015/038975, 4 pages.
(Continued)

*Primary Examiner* — Erin E McGrath
(74) *Attorney, Agent, or Firm* — Suiter Swantz pc llo

(57) ABSTRACT

In an illustrative embodiment, a flow-through fluid heating unit includes an annular member, and a heating element deposited on an inner surface of the annular member, the heating element including three sub-heating elements, each sub-heating element being connected to a separate conduit for receiving a separate phase of a three phase electrical power source. The heating unit may include a baffle core including at least one channel providing a fluid flow path, the baffle core being disposed within the annular member and proximate to the heating element. First and second end fittings may be disposed at each end of the annular member, each end fitting including a fluid port for allowing the fluid to flow through the annular member. One of the end fittings may be releasably connected to the annular member to provide access for removal of the baffle core.

14 Claims, 7 Drawing Sheets

Related U.S. Application Data

(60) Provisional application No. 62/020,803, filed on Jul. 3, 2014.

(58) Field of Classification Search
USPC .................................. 99/281; 392/478, 482
See application file for complete search history.

(56) References Cited

U.S. PATENT DOCUMENTS

| | | | |
|---|---|---|---|
| 3,924,103 A * | 12/1975 | Furuishi | C08L 67/00 |
| | | | 219/528 |
| 4,808,793 A | 2/1989 | Hurko | |
| 4,949,627 A | 8/1990 | Nordskog | |
| 5,408,917 A * | 4/1995 | Lussi | A47J 31/007 |
| | | | 219/428 |
| 5,777,833 A | 7/1998 | Romillon | |
| 5,870,423 A * | 2/1999 | Gustavsson | H05B 3/62 |
| | | | 373/102 |
| 7,822,326 B2 * | 10/2010 | Commette | F24H 1/102 |
| | | | 392/465 |
| 7,861,644 B2 | 1/2011 | Ghassemlou et al. | |
| 2002/0086545 A1 | 7/2002 | O'Donnell et al. | |
| 2003/0021597 A1 | 1/2003 | Chu | |
| 2003/0138244 A1 * | 7/2003 | Long | F24H 9/2028 |
| | | | 392/485 |
| 2005/0279216 A1 * | 12/2005 | Miller | A47J 31/106 |
| | | | 99/279 |
| 2010/0092164 A1 | 4/2010 | Ziehm | |
| 2010/0232772 A1 * | 9/2010 | Chiu | A47J 31/542 |
| | | | 392/441 |
| 2012/0057857 A1 * | 3/2012 | Kenney | F24H 1/142 |
| | | | 392/465 |
| 2013/0312617 A1 | 11/2013 | Toporovsky | |
| 2014/0076171 A1 | 3/2014 | Ramus et al. | |
| 2016/0000262 A1 | 1/2016 | Kelly et al. | |

FOREIGN PATENT DOCUMENTS

| | | | | |
|---|---|---|---|---|
| DE | 102010009538 A1 | | 7/2010 | |
| FR | 583000 A | | 1/1925 | |
| GB | 362584 A | * | 12/1931 | ............. F24H 1/102 |

OTHER PUBLICATIONS

Office Action dated Oct. 10, 2018 for EP Application No. 17211096.
Office Action dated Nov. 2, 2018 for CN Patent Application No. 201580044793.X.
Office Action dated Nov. 28, 2019 for Chinese Patent Application No. 201810018444.6.
Second Office Action received for Chinese Application No. 201810018444.6, dated Jul. 29, 2020, 9 pages.

* cited by examiner

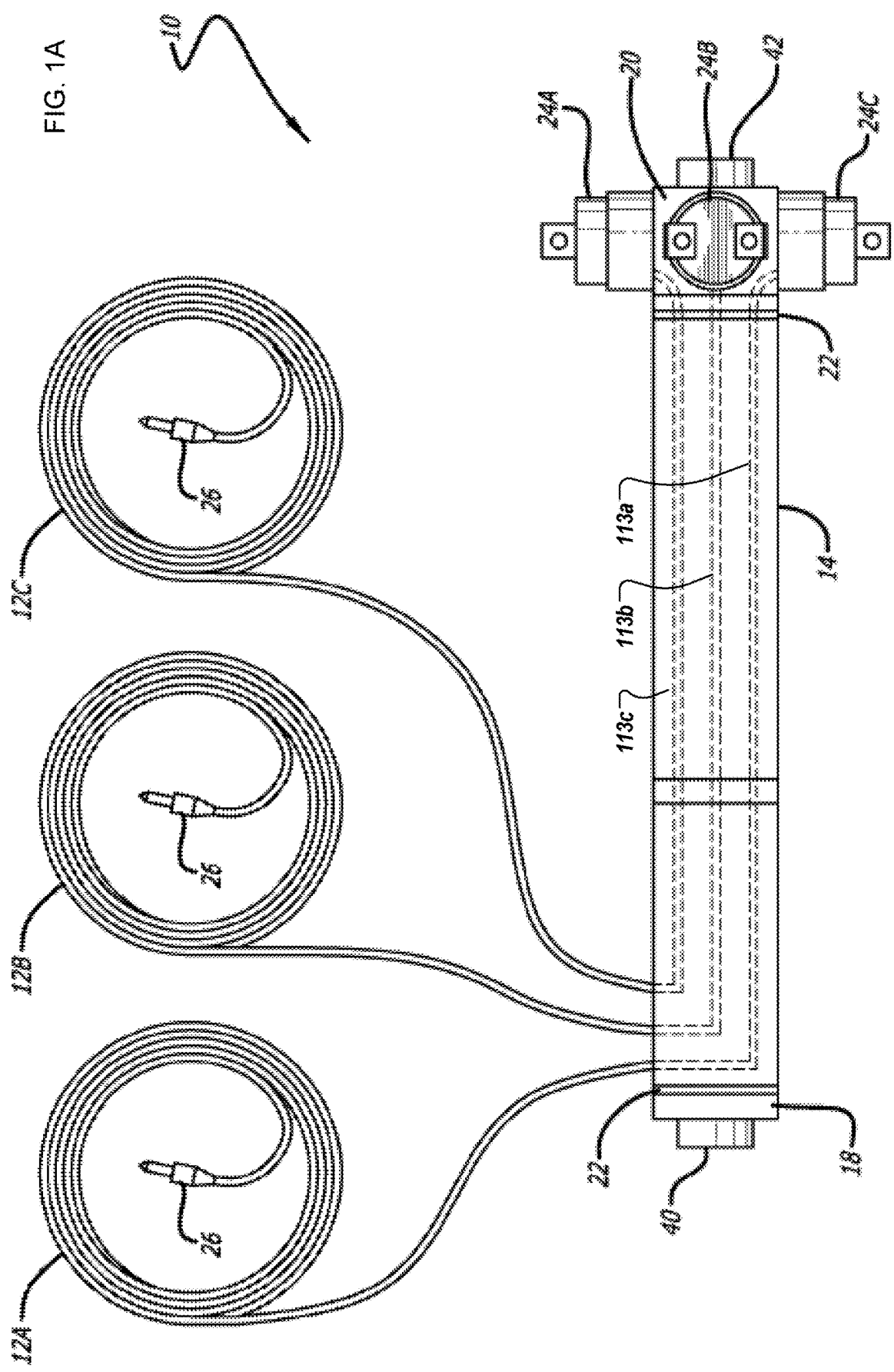

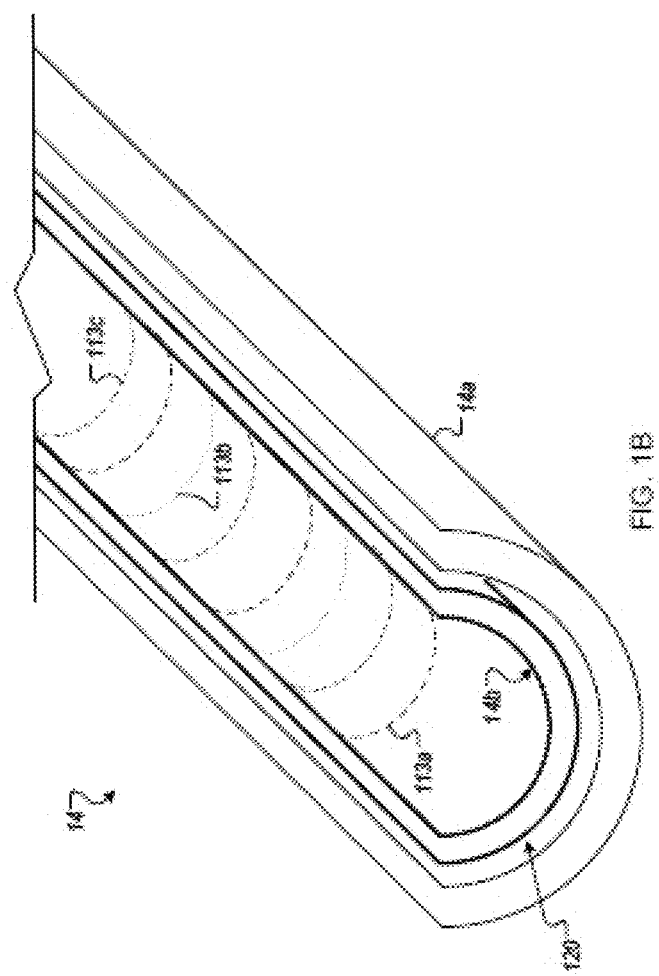

MULTI-PHASE CIRCUIT FLOW-THROUGH HEATER FOR AEROSPACE BEVERAGE MAKER

CROSS-REFERENCES TO RELATED APPLICATIONS

This application is a continuation-in-part of and claims priority to U.S. application Ser. No. 14/754,641, filed Jun. 29, 2015, which claims priority to Provisional Application No. 62/020,803, filed Jul. 3, 2014. The contents of the provisional application are incorporated by reference herein in their entirety.

BACKGROUND

Most coffee brewing apparatus include some form of water heating element to raise the temperature of the water to a level where the oils and extracts of the coffee beans can be released. Water is pumped through a tubing with a resistive heating element that heats the water as it flows through the tubing. The resistive heating element is typically a coiled wire, similar to the element in an electric toaster that heats up when electricity is run through it. In a resistive element like this, the coil is embedded in a plaster to make it more rugged. The heating element serves multiple purposes, namely to initially raise the temperature of the supply water to brewing temperature, and then when the coffee is made, the heating element keeps the coffee warm.

The resistive heating element may be sandwiched between a warming plate and an aluminum water tube. The resistive heating element presses directly against the underside of the warming plate, and white, heat-conductive materials such as grease make sure the heat transfers efficiently. The coffee maker's power switch turns power to the heating element on and off, and to keep the heating element from overheating there are sensors and fuses. In coffee makers, sensors detect if the coil is getting too hot and, if so, cut off the electrical current. When the coil cools down, the sensor turns the current back on. By cycling on and off like this, coffee brewers keep the coil at an even temperature. Similarly, fuses simply cut the power if the temperature reaches a certain level. Fuses are a safety measure in the event that the main sensor fails. Coffee makers also typically employ a one-way valve. The one-way valve lets cold water into the aluminum tube, but forces the bubbles of boiling water to flow up the brew tube.

Most flow-through heating assemblies use a single phase power source to energize the heating element. Examples of such heating assemblies include plasma-sprayed circuit flow-through heaters from Watlow Electric Manufacturing Company of St. Louis, Mo. These heaters receive a flow of water from a water supply and heat the water to a temperature that is appropriate for brewing coffees, teas, espressos, and the like. However, there are several characteristics of such heating units that make them unsuitable for use in aircraft. First, aircraft power systems utilize a three-phase power that cannot be used with the aforementioned single phase heaters. Second, the core of the prior art heating units are fixed, which makes it challenging to determine if deposits are affecting the performance of the heating core. That is, traditional heater assemblies are welded together into a single piece, so the core and end fittings cannot be removed. Thus, the inner passageway of the heater that the water flows through cannot be well monitored for hard water scale buildup. In addition, the current baffles are made from stainless steel, rather than a lightweight plastic more typical in aircraft designs. Third, such cores are typically made of a solid metal, adding weight to the beverage maker that is undesirable to aircraft components. Fourth, these cores lack the capability to effectively monitor the temperature of the water inside the core, which can lead to safety concerns as well as inefficiencies in the heating operation.

Previous attempts to design three-phase flow through heaters for use in aircraft have failed due to the need in such systems to periodically disconnect one or more phases of the power input. That, in turn, caused load imbalances which prevented the heaters from achieving certification by the Federal Aviation Administration.

Moreover, conventional three phase flow-through heating assemblies are enclosed such that the annular flow passage for the liquid cannot be readily accessed for inspection or maintenance. Particularly in aviation applications it is important that flow-through heaters be constructed such that they may be readily inspected and cleaned. A clogged fluid passageway could cause the heater to malfunction, overheat, or create load imbalances. For these additional reasons previously known three phase heaters have proved inadequate for aviation applications.

SUMMARY OF ILLUSTRATIVE EMBODIMENTS

Certain embodiments overcome some or all of these shortcomings and provide a three-phase heating unit for an aircraft beverage maker. In a preferred embodiment, the flow-through water heater includes a removable light-weight baffle core that can be easily removed and inspected to determine if maintenance is required. The baffle core may be fabricated from PEEK plastic, in a particular example, to reduce weight and provide dependable structure and performance. In a preferred embodiment, the heating unit includes integrated resistance temperature detectors (RTDs) that allow the actual heater temperature to be monitored directly, thereby avoiding an over-temperature condition, and incorporates fast-response temperature control. The heating unit may also include a three-phase power input arranged in a wye configuration to help reduce load imbalances.

Other features and advantages of multi-phase flow through heaters will become more apparent from the following detailed description of the illustrative embodiments in conjunction with the accompanying drawings, which illustrate, by way of example, the operation of the multi-phase flow through heaters.

BRIEF DESCRIPTION OF THE DRAWINGS

FIG. 1A is an illustration of an example assembled heating unit;

FIG. 1B is a cut-away view of an annular member housing a resistive heating element;

DETAILED DESCRIPTION OF ILLUSTRATIVE EMBODIMENTS

Figure 2:
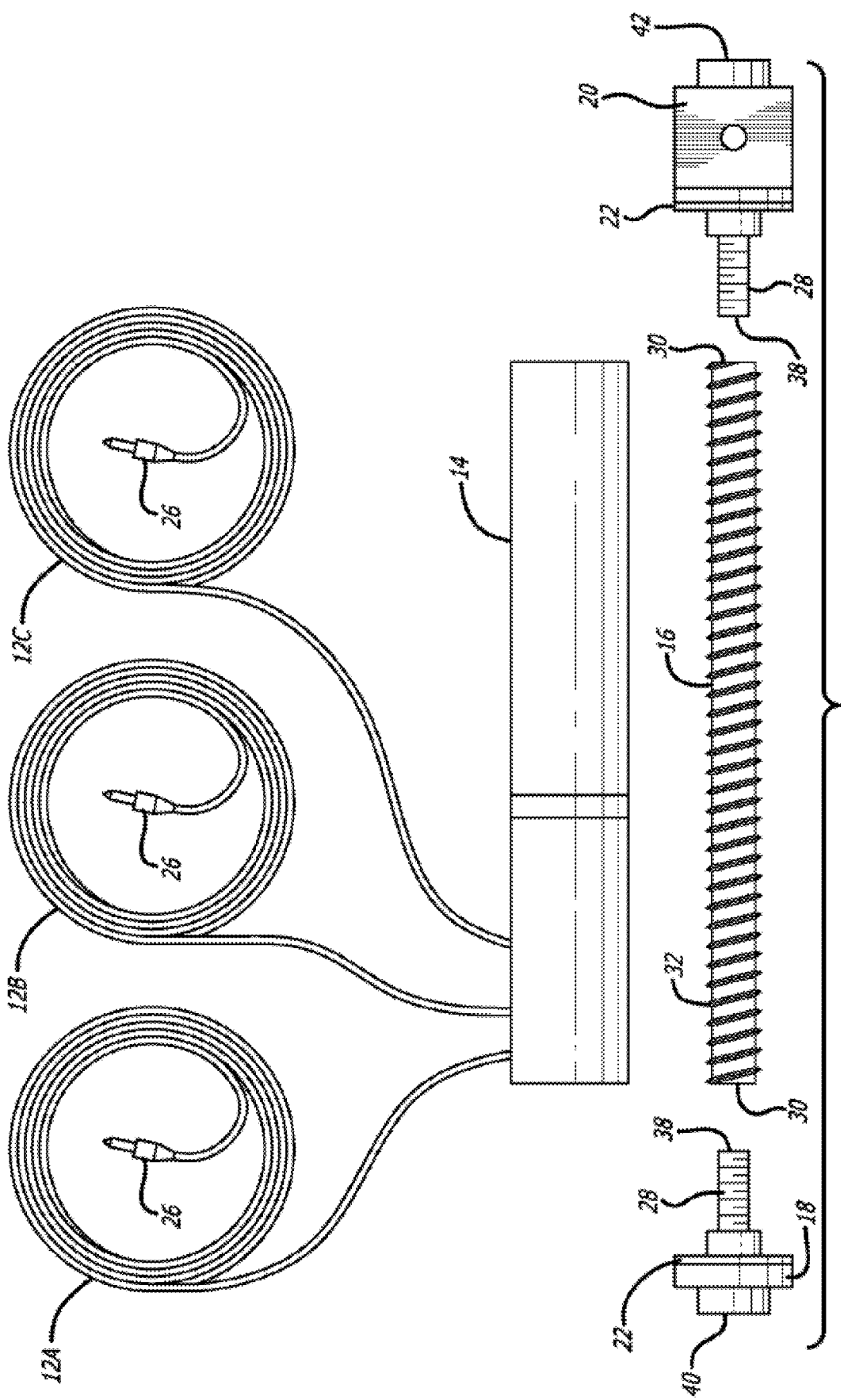
FIG. 2 is an illustration of the components of the heater unit of FIG. 1.

The multi-phase flow through heater examples below describe enhancements to conventional plasma-sprayed circuit flow-through heaters to make such heaters suitable for aircraft beverage maker applications. The enhancements, in certain embodiments, may include: 1) a high-performance, light weight plastic baffle core; 2) removable end fittings and baffle core, which allows for inspection of the core to check for hard water scale buildup inside the heater and enables maintenance and cleaning; 3) integrated RTDs, which allows the actual heater temperature to be monitored directly, thus avoiding an over-temperature situation and enabling fast-response temperature control in operation; and 4) a wye configuration for the three-phase power input to enhance load balancing; 5) a custom-designed circuit that includes dry steam production capability (particularly for espresso beverages) aboard aircraft.

The multi-phase flow through heater examples below, in certain embodiments, are designed to be used in aircraft beverage makers with rapid inline water heating and/or controlled steam production. The traditional heater design for non-aircraft use incorporates a single-phase electrical circuit. However, modern aircraft use a 400 Hz three-phase power supply to comply with FAA regulations. Thus, for regulatory compliance, a multi-phase circuit must be incorporated into the heater. In some embodiments of multi-phase flow through heaters described below, a custom circuit for three-phase power is included to manage the unique power requirements of an aircraft while providing efficient power management.

A multi-phase flow through heater, in some embodiments, includes a plasma-sprayed circuit applied to a stainless steel substrate tube. Integrated resistance temperature detectors, or "RTD"s, may be incorporated into the heater circuit to enable direct monitoring of the heater temperature. This not only provides for better temperature control of the heater circuit, but allows for improved safety as well. For example, while temperature sensors which sense water temperature will function within a specific range, should the water convert to steam, the sensors may malfunction or fail to measure accurately the temperature of the fluid.

FIG. 1A illustrates a fully assembled heating unit 10 according to a first illustrative embodiment, with a three-way electrical conduit 12 that couples the heating unit 10 to a power supply (not shown). An annular body 14 houses a light-weight baffle core 16. The annular body, for example, may be fabricated from a lightweight metal such as stainless steel and/or aluminum. Preferably the surfaces contacting potable water will be formed of, coated with, or electroplated with stainless steel. The light-weight baffle core 16 may be fabricated from a plastic or polymer. In a particular example, the light-weight baffle core is composed of polyether ether ketone (PEEK) plastic or another polyaryletherketone (PAEK) plastic The light-weight baffle core 16, in some embodiments, is made accessible by removably attachable end fittings 18, 20. The ability to quickly and easily disassemble the heating unit 10 also allows for flexibility with various end fittings for functional efficiency and enables easier cleaning and maintenance. For example, the removably attachable end fittings 18, 20 may allow for inspection of possible scale buildup in the multi-phase heater. The end fittings 18, 20, for example, may be threaded into the annular body 14. In another example, the end fittings 18, 20 may be pressure fitting to the ends of the annular body 14. A pair of O-rings 22 or washers may be disposed between the end fittings 18, 20 and the annular body 14. The removable end fittings 18, 20 of the annular body 14, in a particular example, incorporate machined screw threads 28 that screw into tapped holes 30 on each end of the baffle core 16. The end fittings 18, 20 may also have grooves on a mating surface that allow for seating and sealing of the end fittings when the heating unit 10 is assembled. Although described as both being removably attachable, in other embodiments, only one of the end fittings 18, 20 is removably attachable.

The three way electrical conduit 12, in some embodiments, includes one jack 26 for each phase of the electrical power from the power supply, establishing a three-phase power system to convey the voltage to the heating unit 10 in three phases.

The multi-phase flow through heaters described herein include one or more temperature sensors for monitoring temperature of the liquid and/or the heating element. At the end of the annular body 14 illustrated in FIG. 1A, for example, are three resettable temperature sensors 24a, 24b, 24c. The multi-phase flow through heater, for example may allocate a dedicated temperature sensor for each phase of the input power. By monitoring and regulating each phase of the power, the temperature sensing system may provide a far more accurate evaluation of the temperature of the baffle core 16, which in turn provides a measure of the water temperature and system performance. The temperature sensors, in a particular example, may be integrated resistance temperature detectors (RTDs) that allow the actual heater temperature to be monitored directly, thereby avoiding an over-temperature condition and fast response temperature control.

FIG. 2 illustrates an exploded view of the multi-phase heater of FIG. 1A, where the annular body 14 is separated from the end fittings 18, 20 and the plastic baffle core 16 is exposed. Each end fittings 18, 20 inserts into the baffle core 16, and water is heated by a resistive heating element 113 inside the annular body 14 as it is circulated around a spiral pathway 32 of baffle core 16 from one end to the other. Each end fitting 18, 20 includes a stem 38 that fits into fitted holes 30 at the opposite ends of the baffle core 16. The inlet end fitting 18 may include an inlet port 40 for receiving a water stream, and the outlet end fitting 20 may include an outlet port 42 for the water to exit the heating unit 10. A washer 22 may be incorporated into each end fitting 18, 20 to resist leakage at the junctures with the annular body 14. As discussed above, the baffle core 16 may be fabricated of a lightweight plastic or polymer, such as PEEK, to reduce the weight of the core and thereby reduce the weight of the heating unit 10. Further, the baffle core 16, in some implementations, is hollow to greater reduce weight. The pitch of the spiral pathway 32 and or the width of the threads on the baffle core 16 may be selected so as to allow the flow rate of the water in the heating unit 10 to coincide with the heating characteristics of the resistive heating element 113 to efficiently heat the water therein. Although illustrated as a spiral pathway 32, in other embodiments, multiple zig-zag pathways or other patternings may be provided along the baffle 16.

Turning to FIG. 1B, in some implementations, the annular body 14 includes an outer, insulative annular member 14a and an inner annular member 14b. The inner annular member 14b may be fabricated from food grade material, such as stainless steel. Preferably the inner annular member has a relatively low thermal mass such that the temperatures sensed by the RTDs matches closely the actual temperature of the fluid even when the heat transfer to the fluid is at its peak. That can be achieved by using materials that have a relatively low specific heat, such as stainless steel, tungsten, tin, zinc, silver, lead, gold, or platinum. That can also be achieved by reducing the wall thickness of the inner annular member 14b. In certain embodiments the wall thickness is 0.2 mm to 3 mm, in other embodiments the thickness is 0.5 mm to 2 mm, in still other embodiments 0.8 mm to 1.5 mm, and in still further embodiments 1 mm to 1.25 mm. The outer annular member 14*a* may be separated from the inner annular member 14*b* by an air gap 120 to provide additional insulative properties and inhibit transfer of the heat to the ambient environment. The air gap may be from 1 to 4 mm, in other embodiments the from 2-3 mm, in still other embodiments 1-3 mm, and in still further embodiments 2-4 mm. The outer annular member 14*b* may be constructed of a lightweight thermally insulative material including ceramic, polyurethane foam, polystyrene foam, or fiberglass.

In certain embodiments, a power supply (not shown) may provide electrical power to the resistive heating element 113. The power supply may be a three-phase, 208 volt power supply operating at 400 hertz. Other power supplies may also be utilized to power the resistive heating element 113. The application of electrical power may heat the resistive heating element 113, and therefore, heat the adjacent fluid. The resistive heating element 113 may include three separate sub-heating elements 113*a*, 113*b*, 113*c*, as illustrated in FIG. 1A and FIG. 1B. Each sub-heating element 113 may be separately connected to the three-way electrical conduit 12*a*, 12*b*, 12*c*, and each sub-heating element 113*a*, 113*b*, 113*c* may provide a separate phase of the three-phase electrical power. For example, the resistive heating element 113, as illustrated in FIG. 1B, is applied to the inner surface of the inner annular member 14*b* as interlacing spirals or helixes of sub-heating elements 113*a*, 113*b*, 113*c*.

Figure 3:
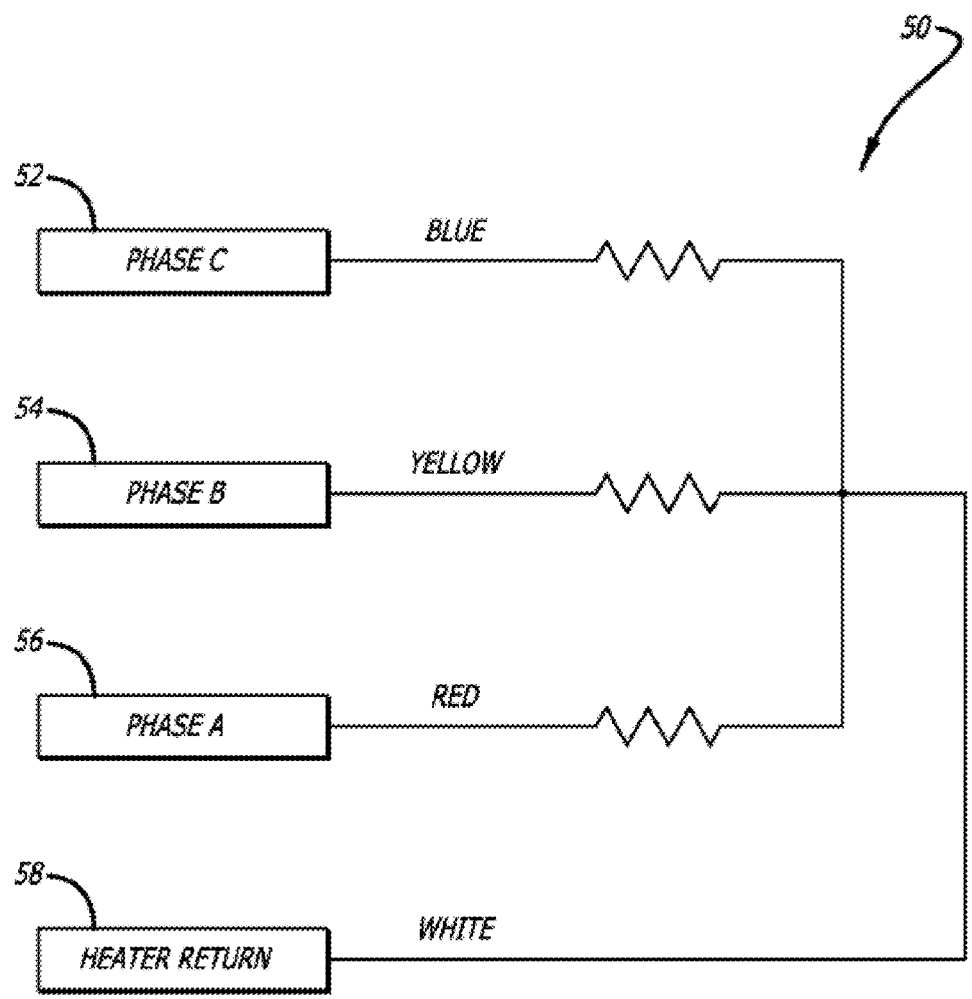
FIG. 3 is a circuit diagram for an example three-phase power supply used on an aircraft.

FIG. 3 illustrates a circuit diagram of an example plasma sprayed circuit 50 for use with a flow-through heater such as flow-through heater 10 of FIG. 1A. The power supply (not shown), in compliance with FAA regulations, would be a 115 volt, three-phase power each having 805 watt maximum, for a 2415 watt total single zone at an operating temperature of 195° F. The wye configuration is shown in FIG. 3, including phase C (blue) 52, phase B (yellow) 54, and phase A (red) 56. The ground or heater return 58 is shown as well (white). The annular body 14, in a particular example, may be 155 mm (6.02 inches) in length, although other sizes are possible, and the wires can be selected to be approximately 304.8 mm (12 inches) in length. The temperature sensors, such as the RTDs 24 of FIG. 1A (e.g., 11*d*2, Class 1B), may be attached at the outlet end of the annular body 14. In an alternate embodiment, the phases are each 533 watts for a total wattage of 1600 watts at an operating temperature of 300° F. This configuration can be used, for example, when the heater operates as both a water heater and a steam generator.

In some embodiments, the housing encompassing the heating element, such as the annular body 14 of FIGS. 1 and 2, may include an inner cylinder or tube 14*b* having a plasma sprayed circuit 50 deposited on its outer surface (e.g., the surface facing the air gap 120). The plasma spray process may include arcing a gas or gas mixture between two electrodes. Potential gas or gas mixtures include helium, argon/hydrogen, argon/helium. By applying a high voltage between the two electrodes, some of the gas or gas mixture between the electrodes becomes a high-temperature plasma. The plasma heats a target. During the heating of the target, the evaporated target material gets deposited onto the inner surface of the annular body 14, forming the resistive heating element, such as resistive heating element 113 as illustrated in FIG. 1A. Possible target materials include nickel, nickel oxide, iron oxide, cobalt oxide, vanadium pentoxide, alumina, or a combination of the materials.

In some embodiments, the plasma sprayed circuit 50 may be deposited to form a helix around the outer surface of the inner annular body 14*b*. The plasma sprayed circuit 50 may also be deposited to form interleaved helixes, zig-zag patterns or other shapes that provide uniform heat transfer to the inner annular body 14*b*.

The plastic baffle core 16 may be inserted into the annular body 14 such that the plastic baffle core 16 abuts the inner surface of the inner annular body 14*b*. Optionally, the threads of baffle core 16 contact the inner surface of the inner annular member 14*b* along the entire periphery or length of the threads. The threads thereby define a spiral pathway 32 along which fluid may flow from the inlet port 40 to the outlet port 42 via the spiral pathway 32. During its travel along this pathway 32 the water is brought to the desired temperature.

Alternatively, the outer diameter of the threads may be less than the inner diameter of the inner annular member 14*b*. In such embodiments, a portion of the fluid may flow axially along the inner surface of the inner annular body 14*b* and other fluid will flow in the spiral pathway 32. Mixing will occur between the two portions of the fluid. This embodiment may be advantageous to provide higher flow rates through the beverage heater.

The temperature of the fluid at the outlet port 42 is a function of the flow-rate of the fluid and, optionally, the power delivered to the resistive heating elements. For example, the temperature of the fluid may be increased by decreasing the flow-rate of the fluid. Alternatively, the temperature of the fluid may be decreased by increasing the flow-rate of the fluid. This may be modified, for example, through selection of a pitch of the spiral pathway 32. The temperature of the fluid at the outlet may also be controlled by altering the power delivered to the heating element 113, optionally in response to signals received from temperature sensors 24A, 24B and 24C. In such embodiments it may be advantageous to keep the power delivered to each of the three sub elements equal, thereby helping to prevent the aforementioned load imbalances. Embodiments in which the temperature is controlled by altering the flow rate of the fluid may provide improved load balancing relative to embodiments in which heater power is changed over time.

In exemplary embodiments, the temperature of the fluid may be extrapolated from temperatures of the sub-heating elements 113*a*, 113*b*, 113*c*. The temperatures of the sub-heating elements 113*a*, 113*b*, 113*c* may be measured by the integrated resistance temperature detectors 24*a*, 24*b*, 24*c*. Each integrated resistance temperature detector 24 may be integrated separately into the sub-heating elements 113.

In some implementations, the baffle core 16 abutting the resistive heating element 113 may be removed from the annular body 14. By removing the baffle core 16 from the annular body 14, a user may perform maintenance tasks, such as cleaning, disinfecting, and repair, to ensure the flow through heating unit 10 functions properly. The baffle core 16 may be removed by unscrewing the end pieces 18, 20, and extracting the stems 38 from holes 30 in the baffle core 16. The stems 38 may include machined screw threads 28 on the surfaces. The holes 30 may also include machined screw threads (not shown) that mateably fit with the machine screw threads 28 of the stems 38. After the extraction of the stems 38, the baffle core 16 may be removed from the annular body 14. Advantageously, the baffle core 16 may be removed even if deposits such as calcium or magnesium have built upon on the inside of the inner annual member 14*b*. Such a buildup will tend to fill or partially occlude the pathway 32 but in that event the threaded baffle core may be "unscrewed" and removed from the partially clogged inner annual member 14b by rotating it in a clockwise or counterclockwise direction.

Figure 4:
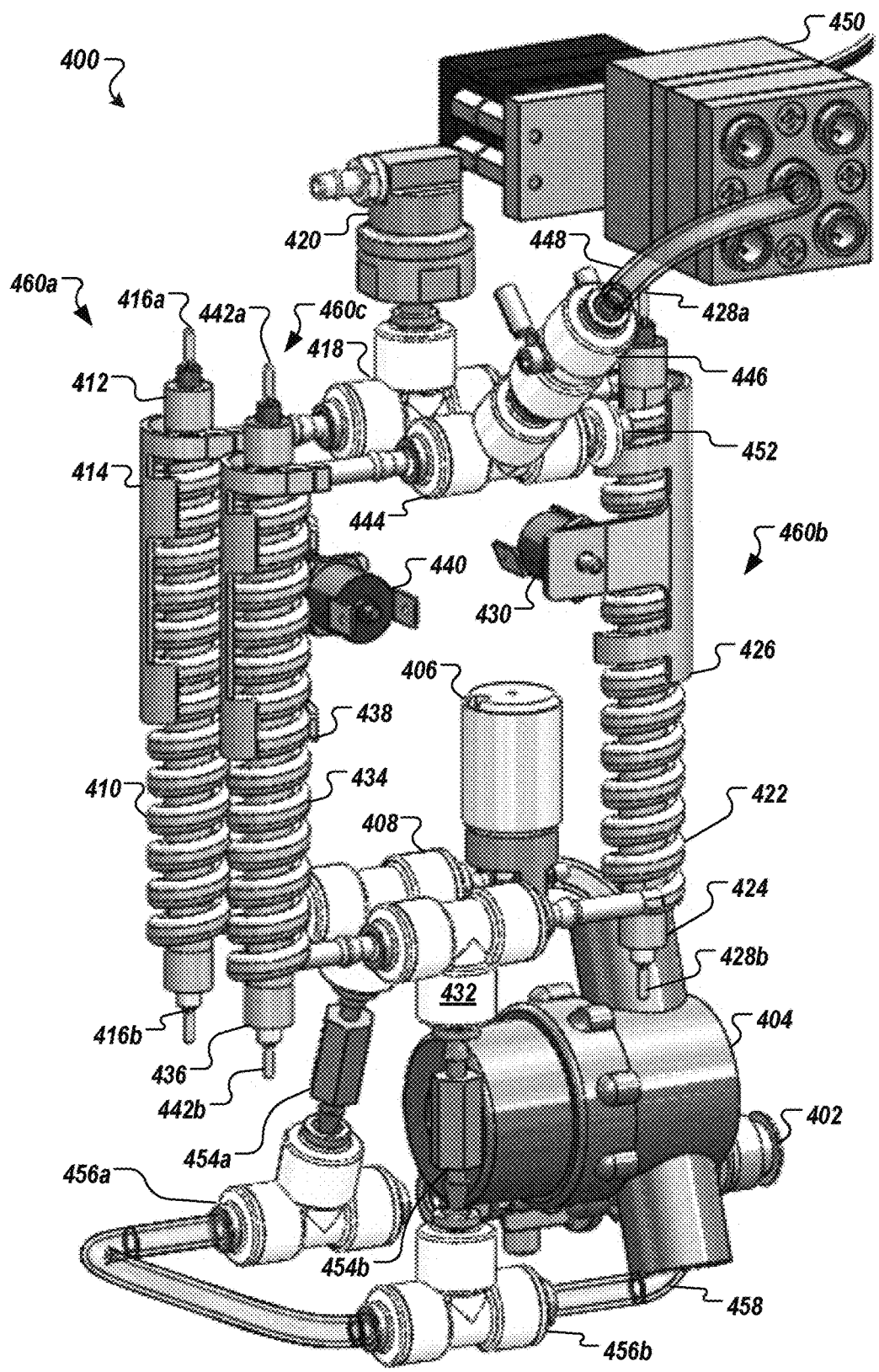
FIG. 4 is an illustration of second example heating unit.

In some implementations, the baffle core 16 may be made of high temperature thermal plastic. For example, the baffle core 16 may be made of polyphenylsulfone. Other materials include polyether ether ketone (PEEK), polysulfone, polypropylene, and polyvinyl chloride. The baffle core 16 is preferably constructed of a light weight material having a density of 0.5 to 2 g/mm$^3$, preferably 0.8 to 1.8 g/mm$^3$, and more preferably 1 to 1.7 g/mm$^3$ FIG. 4 includes another configuration for a multi-phase flow through heating system 400, according to an illustrative embodiment. The multi-phase flow through heating system 400 is embodied in a series of heating units 460. Each heating unit 460 includes a heating element 412, 424, 436 surrounded by a coiled pipe 410, 422, 438 carrying the water supply through the multi-phase flow through heating system. An annular member 414, 426, 438 surrounds each respective heating unit. The annular members 414, 426, 438 may be stainless steel sleeves being thin and having low thermal mass to conduct heat efficiently to temperature sensors 430, 440. In some embodiments, the heating elements 412, 424, 436 are resistive heaters. The heating units 460 may be selectively and separately removed for maintenance, repair, or replacement.

Each heating unit 460, in some embodiments, is powered by a separate phase of a multi-phase power supply. The power supply, in a particular example, may be a three-phase, 208 volt power supply operating at 400 hertz. The application of electrical power may heat the heating elements 412, 424, 436, and therefore, heat any water flowing through the pipes 410, 422, 434 around the heating elements 412, 424, 436. Each heating element 412, 424, 436 may receive a single phase of the three-phase power supply. For example, the heating elements 412, 424, 436 may each be provided a separate phase of the multi-phase power supply to each of the respective heating units' electrodes 416, 428, 442. For example, the first heater 412 may receive electrical power having 0° phase angle, the second heater 424 may receive electrical power having 120° phase angle, and the third heater 436 may receive electrical power having 240° phase angle. Alternatively, each heater may be provided with all three phases of power in which case each of the heating elements 412, 424 and 436 would contain interleaved helixes of three separate sub-elements configured in a manner similar to that depicted in FIG. 1B.

During normal operation, water flows into a water inlet 402, through a particulate filter 404, a solenoid valve 406, and a pipe fitting 408, and into the first pipe 410 surrounding the first resistive heater 412 of a first flow-through heating unit 460a. The first pipe 410 is surrounded by the annular member 414 (illustrated in a cutaway configuration to expose the pipe 410). The first heating unit 460a two electrodes 416a, 416b, and a resettable over-temperature sensor (not shown). Next, water flows through a pipe fitting 418 into the second pipe 422 of a second flow-through heating unit 460b. The pipe fitting 418 is connected to a vent valve 420. The second flow-through heating unit 460b includes the resistive heater 424, the annular member 426, two electrodes 428a, 428b, and a resettable over-temperature sensor 430. Next, water flows through pipe fitting 432 into the third pipe 434 surrounding the third resistive heater 436 of flow-through heating unit 460c. The flow-through heating unit 460b includes the annular member 438, a resettable over-temperature sensor 440, and two electrodes 442a, 442b. Lastly, water flows through a pipe fitting 444, a water detector 446, and an outlet pipe 448, into a rotary valve and servo assembly 450. An end of the pipe fitting 444 is coupled to an outlet resistance temperature detector 452. The flow through heating system 400 may include one way check valves 454a, 454b to allow water to flow into fitting 432 in the event of an unintended interruption of the water supplied through solenoid valve 406. This helps prevent the flow through heater 400 from overheating in the event the filter 404 is clogged or the solenoid valve malfunctions.

In some implementations, as water flows through the particulate filter 404, undesirable impurities in the water may be filtered out so they do not end up in the rest of the beverage maker 400. The particulate filter 404 may include a sieve, activated charcoal, sand, a microporous ceramic filter, a membrane, or other filtration devices for removing impurities. The particulate filter 404 may remove impurities in the water to improve the qualities of the beverages heated by the beverage maker 400, and/or reduce buildup in the beverage maker 400.

In certain embodiments, the solenoid valve 406 may be an electromechanical valve that controls an amount of water flowing through the beverage maker 400. The solenoid valve 406 may control the water flow by modulating the duration of the opening of the valve 406. The solenoid valve 406 may be controlled by a control signal. As water flows through the beverage maker 400, the heating elements 412, 424, 436 may raise the temperature of the water. The temperature of the water may be controlled by the power delivered to the heating elements 412, 424 and 436, optionally based on feedback from RTD temperature sensors positioned in or on those elements. Alternatively or additionally, the temperature of the water may be controlled by the flow-rate of the water, which may be controlled by the solenoid valve 406. For example, the temperature of the water may be increased by decreasing the flow-rate of the water. The temperature of the water may be decreased by increasing the flow-rate of the water through the passageways 410, 422 and 434.

In exemplary implementations, the pipes 410, 422, 434 may be made of stainless steel, or high temperature thermal plastic, both of which have relatively low thermal mass and are relatively light weight in this application. The pipes 410, 422, 434 and/or heating elements 412, 424, 436, in some embodiments, may be removed from their respective annular members 414, 426, 438 for maintenance, such as cleaning, disinfecting, and repair, or replacement. Each of the annular members (e.g. 414) may be surrounded by an insulated sleeve (not shown) having a structure similar to that described above in connection with FIG. 1B.

In certain embodiments, the over-temperature sensors 430, 440 may be resistance temperature detectors. Alternatively, the over-temperatures sensors 430, 440 may be thermistor, thermocouple, or silicon bandgap sensors.

Figure 5:
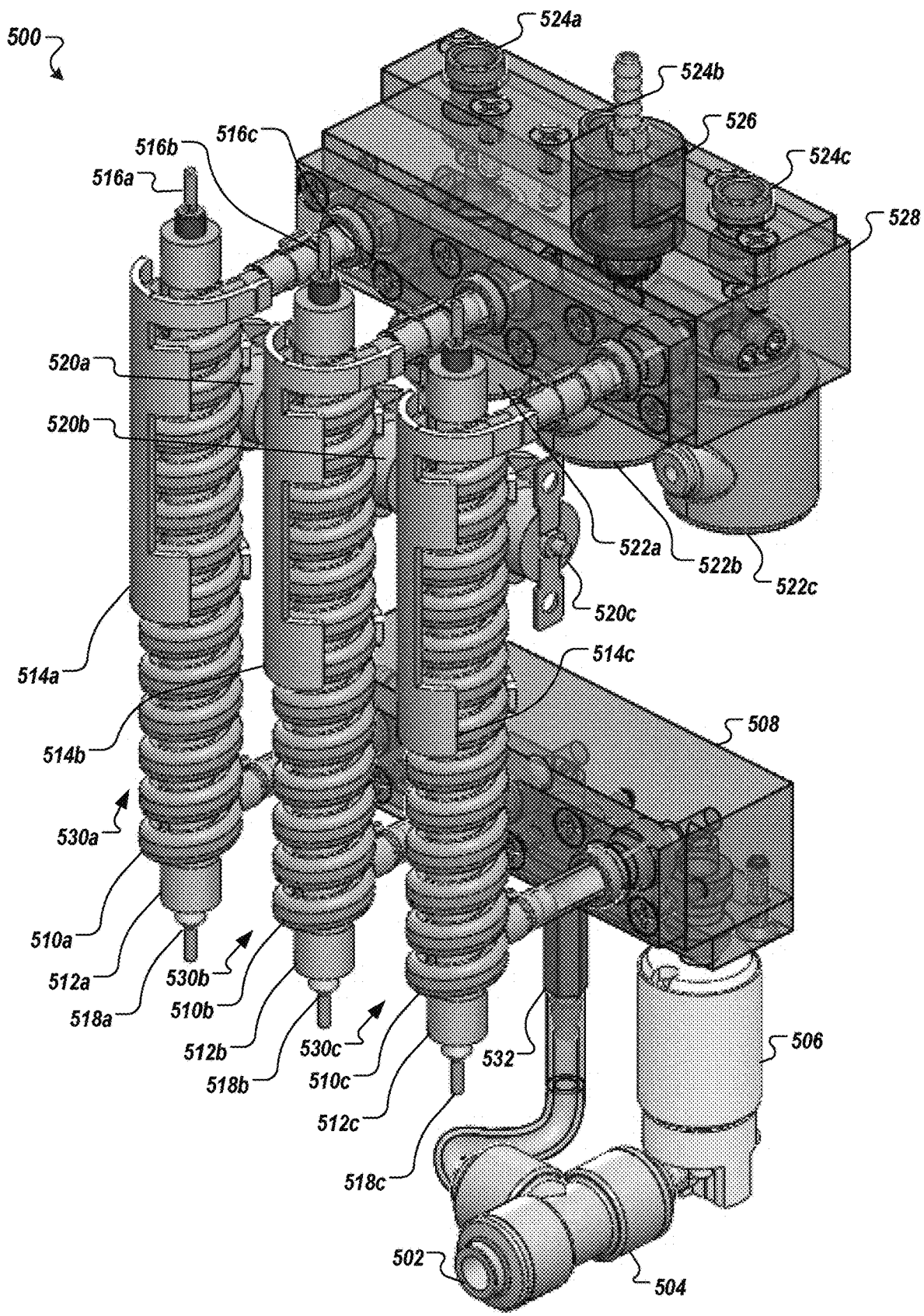
FIG. 5 is an illustration of a third example heating unit.

Referring to FIG. 5, another example of a multi-phase flow through heating system 500 is illustrated. The multi-phase flow through heater system includes three flow-through heating units 530 configured in parallel. Each heating unit 530 includes a coiled pipe 510 surrounding a heating element 512. Each heating element 512 includes a respective annular member 514 (illustrated in cut-away view to expose the respective heating elements 512). The first flow-through heating unit 530a includes electrodes 516a, 518a and a temperature sensor switch 520a. The second flow-through heating unit 530b includes electrodes 516b, 518b and a temperature sensor switch 520b. The third flow-through heating units 530c includes electrodes 516c, 518c and a temperature sensor switch 520c.

During normal operation, water flows into a water inlet 502, through a pipe fitting 504, and a solenoid valve 506. Next, water flows into a first manifold 508, splits into three separate streams, and into a first, second, and third pipe 510*a*, 510*b*, 510*c*. The first manifold 508 includes a check valve 530 having similar functionality to that described above. As the three streams flow through the pipes 510, the heating elements 512 may increase temperatures of the three streams. Next the three streams flow from the pipes 510 into a second manifold 528, through the first, second, and third solenoid valve 522*a*, 522*b*, 522*c*, and out the first, second, and third outlet 524*a*, 524*b*, 524*c*. The second manifold 528 includes a venting device 526.

In certain embodiments, the solenoid valve 506 may be an electromechanical valve that controls an amount of water flowing through the beverage maker 500. The solenoid valve 506 may control the water flow by modulating the duration of the opening of the valve 506. The solenoid valve 506 may be controlled by a control signal. As water flows through the heating system 500, the heating elements 512 may raise the temperatures of the three streams. The temperatures of the streams may be controlled by the flow-rate of the streams, which may be controlled by the solenoid valve 506. For example, the temperatures of the streams may be increased by decreasing the flow-rate of the streams. Alternatively, the temperatures of the streams may be decreased by increasing the flow-rate of the streams. As described above, the temperature of the fluids at the output may additionally or alternatively be controlled by altering the power delivered to the heating elements.

In exemplary implementations, the pipes 510 may be made of stainless steel or high temperature thermal plastic. The pipes, in some embodiments, 510 may be removed from their respective shells 514 for maintenance, such as cleaning, disinfecting, and repair, or replacement.

In some embodiments, the heating elements 512 are resistive heaters. A power supply (not shown) may provide a three-phase electrical power to the heating elements 512. The power supply, in a particular example, may be a three-phase, 208 volt power supply operating at 400 hertz. The power supply may provide electrical power to the heating elements 512 via electrodes 516, 518. The application of electrical power may heat the heating elements 512 and therefore, heat the three streams flowing through the pipes 510. Each heating element 512*a*, 512*b*, 512*c* may receive a single phase of the three-phase power supply. For example, the first heating element 512*a* may receive electrical power having 0° phase angle, the second heating element 512*b* may receive electrical power having 120° phase angle, and the third heating element 512*c* may receive electrical power having 240° phase angle. The heating elements 512, in some embodiments, may be selectively and separately removed for maintenance, repair, or replacement.

In certain embodiments, the over-temperature sensors 520 may be resistance temperature detectors. Alternatively, the over-temperatures sensors 520 may be thermistor, thermocouple or silicon bandgap sensors.

In some implementations, the three streams of water may be selectively output of the outlets 524 by separately operating the solenoid valves 522. For example, heated water may exit the first outlet 524*a* only by opening the solenoid valve 506 and the solenoid valve 522*a*, and closing the solenoid valves 522*b*, 522*c*. In another example, heated water may exit the second and third outlets 524*b*, 524*c* only by opening the solenoid valve 506 and the solenoid valves 522*b*, 522*c*, and closing the solenoid valve 522*a*.

In some embodiments, the first, second, and third outlets 524*a*, 524*b*, 524*c* may be connected to different dispensers. For example, the first outlet 524*a* may be connected to a coffee dispenser, the second outlet 524*b* to a tea dispenser, and the third outlet 524*c* to a hot water dispenser.

In alternative embodiments, the heating elements 512 may be replaced with the heating unit 10. One of the main differences between heating element 512 and heating unit 10 is that the former applies heat on the interior of a spiral fluid passageway whereas the latter applies heat to the exterior of a spiral fluid passageway. In some embodiments the former may be more compact and lighter weight.

Figure 6:
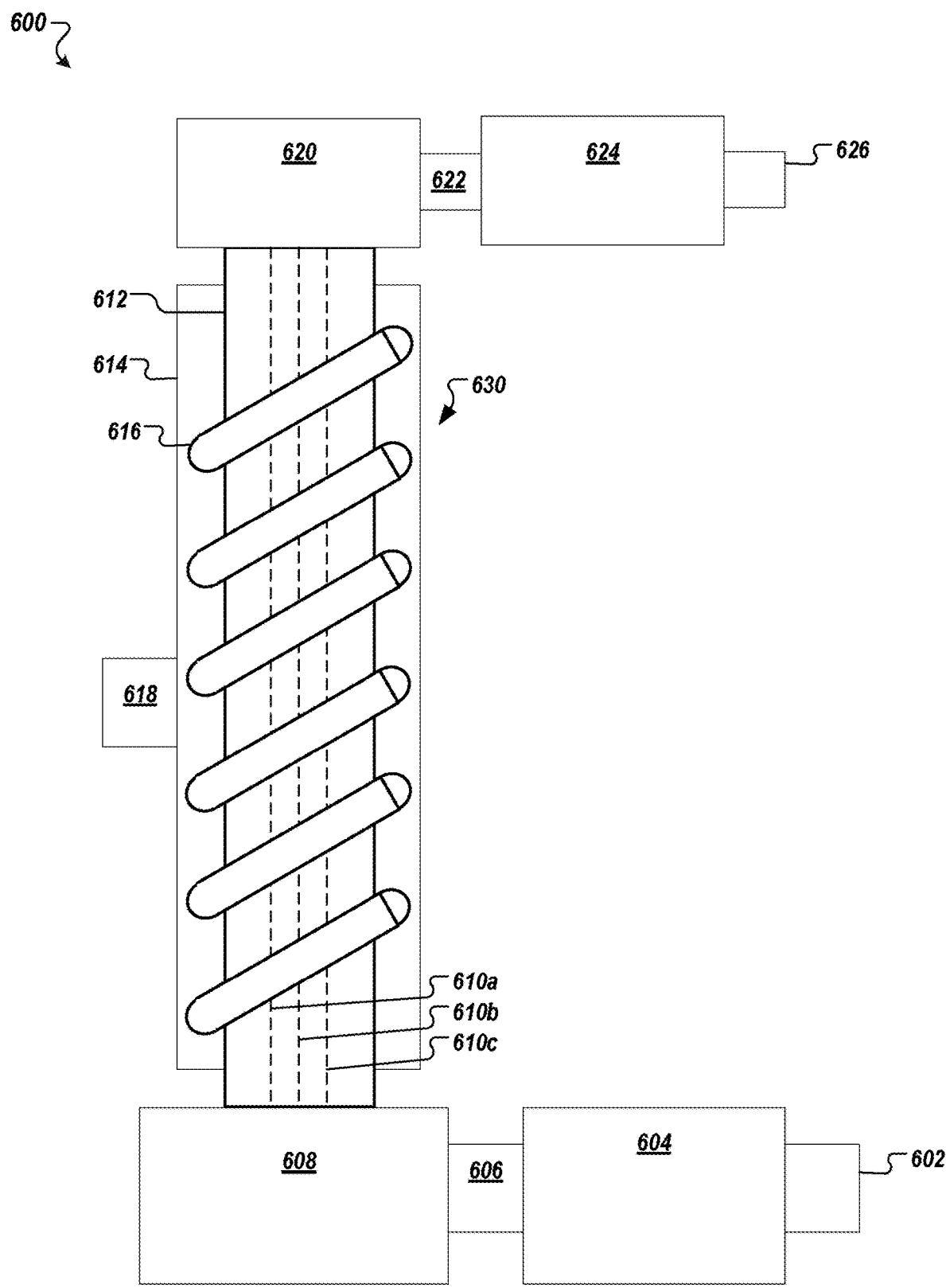
FIG. 6 is an illustration of a fourth example heating unit.

Turning to FIG. 6, a flow through heater 600 includes another configuration of a multi-phase flow through heating system, according to an illustrative embodiment. The multi-phase flow through heating system is embodied in a heating unit 630. The heating unit 630 includes a heating element 612 surrounded by a coiled pipe 616 carrying the water supply through the multi-phase flow through heating system. An annular member 614 surrounds the heating element 612. The annular member 614, for example stainless steel sleeves or other materials having low thermal mass and high thermal conductivity as described above. The annular sleeve member 614 thus helps distribute the heat evenly around coiled pipe 16. The annular sleeve member 614 may be surrounded by an insulative sleeve (not shown) having the properties described above. In an alternative embodiment, the coiled pipe 16 may instead be a passageway formed in the annular sleeve 614 and further defined by the outer surface of the heating element 612. The heating element 612 may be readily removed for maintenance, repair, or replacement by first removing the fitting 620 and/or 608 and then extracting the heating element 612 and/or the annular sleeve 614 for cleaning and/or replacement. In the alternative embodiment in which the coiled pipe is instead a passageway formed in the annular sleeve 614, the annular sleeve may be replaced instead of being cleaned.

In some embodiments, the heating element 612 includes a first, second, and third heating sub-element 610*a*, 610*b*, 610*c*. Each heating sub-element 610, in some embodiments, is powered by a separate phase of a multi-phase power supply. The power supply, in a particular example, may be a three-phase, 208 volt power supply operating at 400 hertz. The application of electrical power may heat the heating sub-elements 610, and therefore, heat any water flowing through the pipe 616 around the heating element 612. Each heating sub-element 610*a*, 610*b*, 610*c* may receive a single phase of the three-phase power supply. For example, the first heating sub-element 610*a* may receive electrical power having 0° phase angle, the second heating sub-element 610*b* may receive electrical power having 120° phase angle, and the third heating sub-element 610*c* may receive electrical power having 240° phase angle.

During normal operation, water flows into a water inlet 602, through a particulate filter 604, a pipe fitting 606, and a solenoid valve 608, and into the pipe 616 surrounding the resistive heating element 612. The pipe 616 is surrounded by the annular member 614. The heating unit 630 includes a resettable over-temperature sensor 618. Lastly, water flows through a vent valve 620, a pipe fitting 622, a water detector 624, and an outlet pipe 626.

In some implementations, as water flows through the particulate filter 604, undesirable impurities in the water may be filtered out so they do not deposit elsewhere in the flow-through heater 600 or in the potable beverage. The particulate filter 604 may include a sieve, activated charcoal, sand, a microporous ceramic filter, a membrane, or other filtration devices for removing impurities. The particulate filter 604 may remove impurities in the water to improve the qualities of the beverages heated by the beverage maker 600, and/or reduce buildup in the beverage maker 600.

In certain embodiments, the solenoid valve 608 may be an electromechanical valve that controls an amount of water flowing through the beverage maker 600. The solenoid valve 608 may control the water flow by modulating the duration of the opening of the valve 608. The solenoid valve 608 may be controlled by a control signal. As water flows through the beverage maker 600, the heating element 612 may raise the temperature of the water. The water temperature may be controlled as discussed above. The pipe 616 and temperature sensor 618 may have the properties and construction described above.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

The invention claimed is:

1. An aircraft beverage making apparatus including at least two flow-through heating units for heating a fluid, the aircraft beverage making apparatus comprising:
   a three way electrical conduit for conducting electrical power in three separate phases, wherein the three way electrical conduit includes three jacks with one jack for each phase, the electrical power enabling the aircraft beverage making apparatus to generate heated water and steam;
   a first member, said first member being generally annular;
   a second member, said second member being generally annular;
   a third member mounted to the first member, the third member being a first coiled pipe, the third member defining a helical flow path without or around the first member;
   a fourth member mounted to the second member, the fourth member being a second coiled pipe, the fourth member defining a helical flow path without or around the second member;
   a first heating element disposed along substantially an entire length of the third member, said first heating element receiving three phases of a three phase power supply via the three way electrical conduit, wherein the first heating element comprises interleaved helixes of three separate first sub-heating elements, each first sub-heating element receiving a different phase of the three-phase power supply;
   a second heating element disposed along substantially an entire length of the fourth member, said second heating element receiving three phases of the three-phase power supply via the three way electrical conduit, wherein the second heating element comprises interleaved helixes of three separate second sub-heating elements, each second sub-heating element receiving a different phase of the three-phase power supply;
   a plurality of valves controlling flow of a first fluid through the third member and a flow of the second fluid through the fourth member in response to a control signal;
   a fifth member, said fifth member being generally annular, said fifth member disposed around the first member, the third member, and the first heating element;
   a sixth member, said sixth member being generally annular, said sixth member disposed around the second member, the fourth member, and the second heating element; and
   first, second, and third resettable temperature sensors such that a temperature of the aircraft beverage making apparatus is directly monitorable, each of the first, second, and third resettable temperature sensors connected to a separate phase of power from the three way electrical conduit such that each of the three separate phases is separately monitorable, wherein the first, second, and third resettable temperature sensors are resistance temperature detectors (RTDs);
   wherein each of the at least two flow-through heating units includes one of the first, second, and third resettable temperature sensors implemented as an over-temperature sensor.

2. The beverage making apparatus of claim 1, wherein the third member is arranged in parallel to the fourth member such that the first fluid follows a different flow path than the second fluid.

3. The beverage making apparatus of claim 1, wherein the first member and the second member are not coaxial with one another.

4. The beverage making apparatus of claim 1, wherein the first heating element and the second heating element are disposed in a series fluid flow configuration.

5. The beverage making apparatus of claim 1, wherein the first heating element and the second heating element are disposed in a parallel geometric configuration.

6. The beverage making apparatus of claim 1, further comprising:
   a first dispenser coupled to an outlet of the third member, the first dispenser configured to dispense the first fluid; and
   a second dispenser coupled to an outlet of the fourth member, the second dispenser configured to dispense the second fluid.

7. The beverage making apparatus of claim 1, further comprising:
   a first check valve coupled to an inlet of the third member, the first check valve configured to prevent back flow of the first fluid through the third member; and
   a second check valve coupled to an inlet of the fourth member, the second check valve configured to prevent back flow of the first fluid through the fourth member.

8. The beverage making apparatus of claim 1, further comprising at least one filter disposed at an inlet to the third member, the at least one filter configured to filter impurities from the first fluid entering the third member.

9. The beverage making apparatus of claim 1, wherein the first member is disposed around the first heating element and the second member is disposed around the second heating element.

10. The beverage making apparatus of claim 1, wherein the first heating element is disposed on or within the first member and the second heating element is disposed on or within the second member.

11. The beverage making apparatus of claim 1, wherein the plurality of valves includes at least one inlet solenoid valve disposed at an inlet of the third member, the at least one inlet solenoid valve configured to control the flow of the first fluid into the inlet of the third member.

12. The beverage making apparatus of claim 1 wherein the plurality of valves includes at least one outlet solenoid valve disposed at an outlet of the fourth member, the at least one outlet solenoid valve configured to control the flow of the second fluid from the outlet of the fourth member.

13. An aircraft beverage making apparatus comprising:
a three way electrical conduit for conducting electrical power in three separate phases, wherein the three way electrical conduit includes three jacks with one jack for each phase, the electrical power enabling the aircraft beverage making apparatus to generate heated water and steam;
first, second, and third resettable temperature sensors such that a temperature of the aircraft beverage making apparatus is directly monitorable, each of the first, second, and third resettable temperature sensors connected to a separate phase of power from the three way electrical conduit such that each of the three separate phases is separately monitorable, wherein the first, second, and third resettable temperature sensors are resistance temperature detectors (RTDs); and
a plurality of flow-through heating units for heating a fluid, each of the plurality of flow-through heating units comprising
a heating element for applying heat to the fluid in response to receiving electrical power from three phases of a three-phase power source via the three way electrical conduit, wherein the heating element comprises interleaved helixes of three separate sub-heating elements, each sub-heating element receiving a different phase of the three-phase power source, and means for providing a flow path for the fluid proximate the heating element, wherein the means for providing the flow path for the fluid comprises a coiled pipe helically wrapped around an outer surface of the heating element;

means for controlling a flow of the fluid through the means for providing the flow path;

an annular member disposed around the heating element and the means for providing a flow path for the fluid proximate the heating element; and one of the first, second, and third resettable temperature sensors implemented as an over-temperature sensor, thereby controlling heat transfer between the heating element of each of the plurality of flow-through heating units and the fluid;

wherein each of the plurality of flow-through heating units is configured to be selectively removed from the beverage making apparatus, thereby enabling cleaning, repair, or replacement.

14. The beverage making apparatus of claim 13, wherein the plurality of flow-through heating units are arranged to receive fluid in parallel.

* * * * *